United States Patent [19]
Sorkin

[11] 3,952,301

[45] Apr. 20, 1976

[54] DIGITAL ADAPTIVE SPEED CONTROL FOR VEHICLES

[75] Inventor: Morris Sorkin, Santa Monica, Calif.

[73] Assignee: TRW Inc., Redondo Beach, Calif.

[22] Filed: Feb. 11, 1974

[21] Appl. No.: 441,100

[52] U.S. Cl. .............................................. 343/7 VM
[51] Int. Cl.² ........................................... G01S 9/46
[58] Field of Search ............. 343/7 ED, 7 VM, 5 DP

[56] References Cited
UNITED STATES PATENTS

| | | |
|---|---|---|
| 2,461,005 | 2/1949 | Southworth ...................... 343/18 D |
| 3,199,104 | 8/1965 | Miller .............................. 343/5 DP |
| 3,281,839 | 10/1966 | Triest et al. ...................... 343/5 DP |
| 3,399,404 | 8/1968 | Githens et al. ................... 343/5 DP |
| 3,559,756 | 2/1971 | Torres .......................... 343/7 ED X |
| 3,689,882 | 9/1972 | Dessailly .......................... 343/7 ED |
| 3,710,383 | 1/1973 | Cherry et al. ..................... 343/7 ED |
| 3,710,385 | 9/1970 | Howard et al. .......................... 343/9 |
| 3,725,921 | 4/1973 | Weidman et al. ................. 343/7 ED |
| 3,750,171 | 7/1973 | Faris ....................................... 343/9 |
| 3,820,119 | 6/1974 | Casse et al. .................... 343/5 DP X |

Primary Examiner—Malcolm F. Hubler
Attorney, Agent, or Firm—Daniel T. Anderson; Edwin A. Oser; Jerry A. Dinardo

[57] ABSTRACT

A sensor, such as a radar, is mounted on a moving vehicle equipped with a speed control system which normally maintains the vehicle speed constant at a pre-set speed in the absence of a preceding vehicle within a safe distance. The sensor detects the presence of a preceding vehicle and measures the distance and closing speed of the controlled vehicle with respect to the preceding vehicle, and generates an adaptive speed signal. The adaptive speed signal modifies the error signal of the speed control system which controls either the throttle or brake to cause the controlled vehicle to match its speed to the speed of the preceding vehicle, and to maintain a safe distance from it, thereby making the adaptive speed signal vanish. The error signal may be modified by the adaptive speed signal either by decreasing the desired speed or by increasing the actual speed. The desired, actual, and adaptive speeds may all be represented by digital numbers.

4 Claims, 10 Drawing Figures

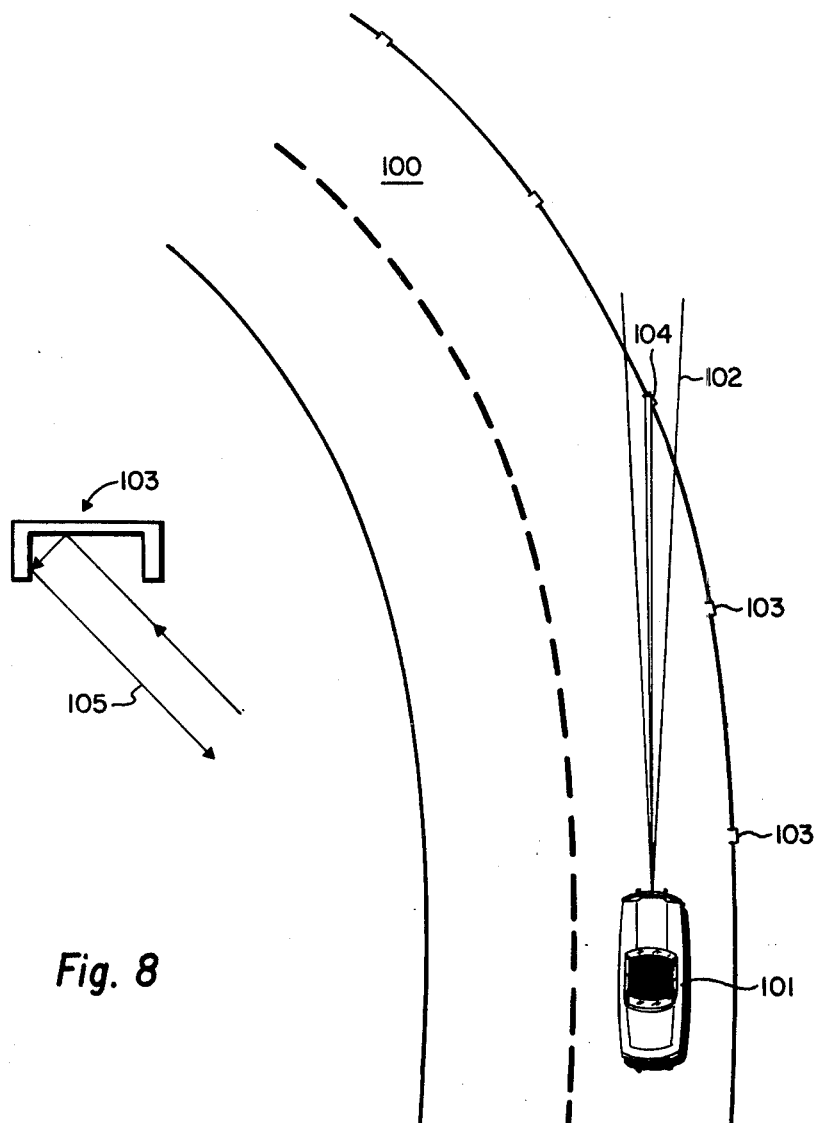
Fig. 7
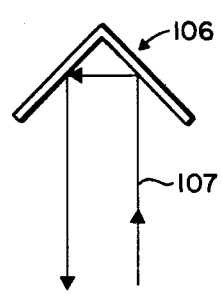
Fig. 8
Fig. 9

DIGITAL ADAPTIVE SPEED CONTROL FOR VEHICLES

BACKGROUND OF THE INVENTION

This invention relates generally to adaptive speed control systems and particularly relates to a digital adaptive speed control for vehicles such as automobiles.

Various speed control devices for controlling the speed of a vehicle are well known in the art. Such a speed control will permit the driver to set a desired speed which is then automatically maintained by opening or closing the throttle in response to an error signal developed by the speed control.

In general such speed control systems compare the desired speed to the actual vehicle speed to derive an error or control signal. Recently digital speed control systems have become known which make use of computer techniques for developing a digital error signal. Generally the desired speed of the car is stored in a digital memory such as a counter or register. The actual speed of the vehicle as represented by a pulse train is periodically stored for a predetermined period of time in another digital register or speed counter. Now the two digital numbers are compared to generate the error signal.

While such digital speed control systems will control the vehicle speed over extended trips very precisely, they do have certain drawbacks. If the driver is not attentive he may have an accident because the car ahead of the controlled car may have a lower speed. Furthermore the known digital speed control systems only operate on the throttle of the car to either accelerate of decelerate the car by controlling the amount of fuel fed into the engine.

Various adaptive speed control systems have been proposed in the past. Some of these do not provide a digital control of either the speed or for modifying the digital speed error signal in accordance with the distance of closing speed of another car. Other anticollision devices which provide automatic control of the vehicle brakes do not include a speed control. Still other systems utilize radar as a relative speed detector only. In this case use is made of the Doppler effect which does not provide range information. Finally, it has been proposed to control trains to avoid collisions. In this case use is made of the rails as a waveguide to transmit information. Again in this proposed system there is no speed control which ties in with the radar information.

It is accordingly an object of the present invention to provide an adaptive speed control for vehicles which will modify the set speed in accordance with the closing speed and distance to a vehicle ahead of the controlled car.

A further object of the present invention is to provide an adaptive speed control of the type disclosed which actuates the brakes to avoid accidents caused by a slower car ahead of the controlled car.

Another object of the present invention is to provide such an adaptive speed control system where the braking effort is a function of the closing speed and distance of the controlled vehicle with respect to another detected vehicle.

Still a further object of the invention is to provide an adaptive speed control system for vehicles which will modify the pre-set speed in accordance with the presence of spaced roadside reflectors on a curve, thus automatically reducing the vehicle speed to a safe value for the curve.

SUMMARY OF THE INVENTION

The digital adaptive speed control system of the invention includes a digital speed control. This in turn comprises means for generating a train of pulses representative of the speed of the vehicle. A memory counter is coupled to the pulse generator, for storing a first binary number representative of the desired speed of the vehicle. There is further provided a speed counter, also coupled to the pulse generator, for storing, during a predetermined period of time, a second binary number representative of the actual vehicle speed. Finally, comparator means are coupled to the memory counter, and to the speed counter, for comparing the first binary number with the second binary number, and for generating a digital error signal.

Both a throttle actuator and a brake actuator are coupled to the comparator means. A sensor, which is preferably a radar transmitter and receiver, is provided for sensing the distance and closing speed to another vehicle and for developing distance and closing speed signals. The closing distance may simply be obtained by comparing successive distance signals. The distance and closing speed signals are combined in an adaptive processor to provide an adaptive or equivalent closing speed signal. The adaptive speed signal is now impressed on the comparator means for modifying the error signal in accordance with the equivalent closing speed. Finally, the brake actuator is selectively actuated to reduce the speed of the controlled vehicle in response to a decrease of the spacing or an increase of the closing speed between the two vehicles.

Thus basically the digital numbers representing the set speed of the car is reduced or the digital number representing the actual speed of the car is increased in accordance with the equivalent closing speed. This information is used to cut off the throttle actuator and to actuate the brakes. The braking effort may be proportional to the equivalent closing speed up to a limiting value.

It is also possible to operate the brakes in accordance with a square law to optimize the braking response.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 7 is a top plan view of a portion of a curved road provided with guard rails and showing a vehicle with a radar;

FIG. 8 is a cross-sectional view of a generally U-shaped guard rail for reflecting radar pulses; and FIG. 9 is a cross-sectional view of another reflective guard rail of generally V-shape.

DESCRIPTION OF THE PREFERRED EMBODIMENT

Figure 1:
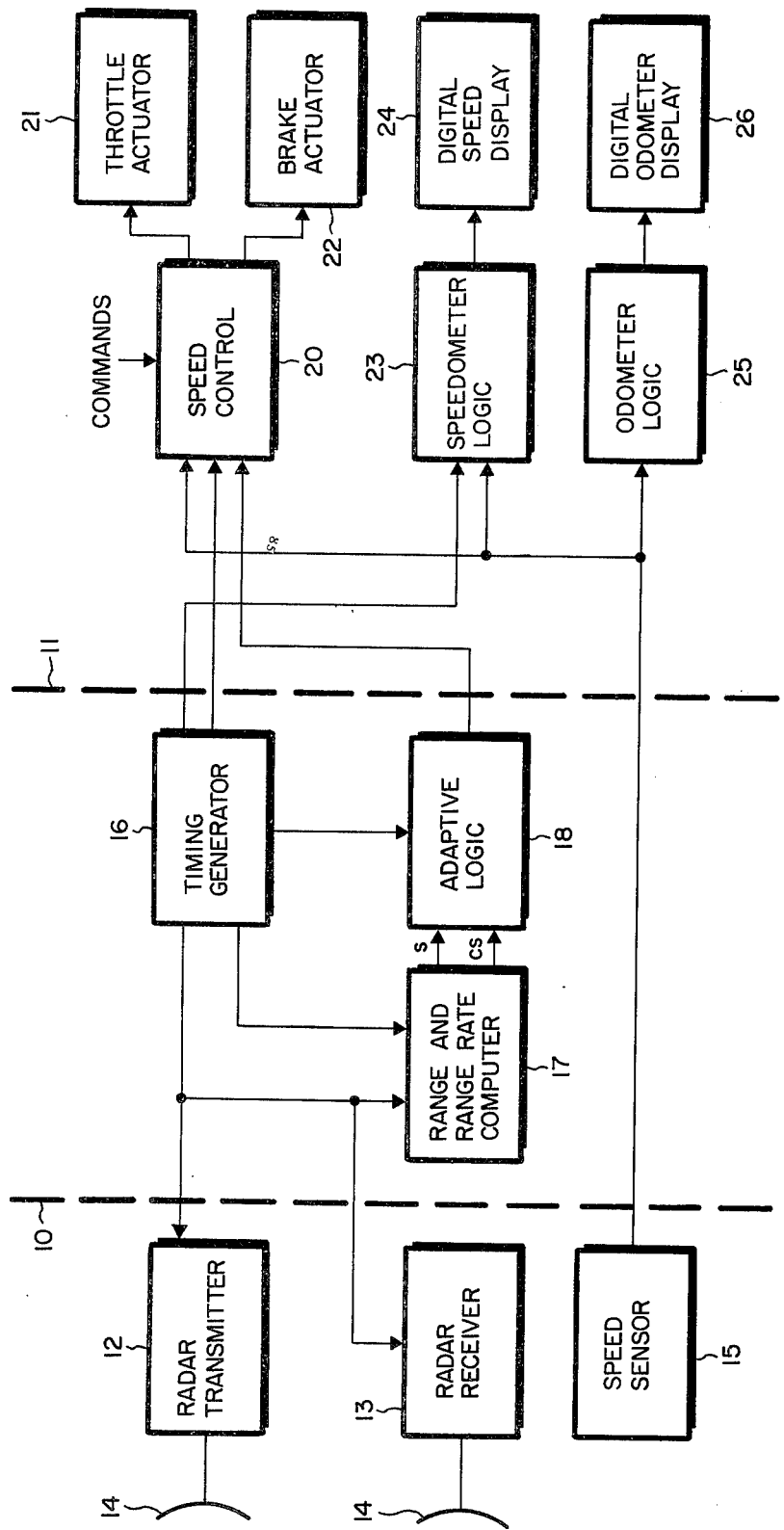
FIG. 1 is a block diagram illustrating the basic subsystems of the adaptive speed control system of the invention.

Referring now to the drawings and particularly to FIG. 1, there is illustrated in somewhat schematic fashion the adaptive speed control system of the invention subdivided into its major portions. Thus to the left of the dotted line 10 there is illustrated the sensor subsystem. The signal processor subsystem is disposed between dotted lines 10 and 11 while the speed control subsystem is shown to the right of dotted line 11.

The sensor subsystem includes a sensor for sensing spacing and closing speed to another vehicle ahead of the controlled vehicle. Preferably, the spacing and relative speed sensor consists of a radar including a transmitter 12 and a receiver 13 each having an antenna 14 or else a common antenna. While it is feasible to utilize other types of sensors for the spacing and closing speed a radar is preferred in connection with the present invention.

There is also provided a speed sensor 15. As will be more fully explained hereinafter the speed sensor 15 develops a pulse train having a number of pulses per unit of time representative of the actual vehicle speed.

The signal processor subsystem includes a timing generator 16 which is common to the entire system. It controls both radar transmitter 12 and radar receiver 13. In addition it controls a range and range rate computer 17. This will compute in a conventional manner the range, that is the distance to a vehicle ahead of the controlled vehicle. It will also compute the range rate or closing speed to the other vehicle. This may, for example, be computed by comparing the range information obtained during successive cycles which, of course, is the rate of change of range. Accordingly, the range and range rate computer 17 develops a signal S which is the distance or spacing to the other vehicle and a signal CS which is the closing speed. This information is fed to the adaptive logic 18 which will be more fully explained hereinafter and which generates an output signal representative of the adaptive or relative speed which is impressed on the speed control 20 forming part of the speed control subsystem.

The speed signal pulses from the speed sensor 15 are also fed into the speed control 20 as are timing signals from the timing generator 16. The speed control 20 develops an error signal representative of the difference between the desired or set speed and the actual vehicle speed. This error signal is then modified by the relative speed provided by the adaptive logic 18. As a result either the throttle actuator 21 or the brake actuator 22 are actuated to operate either on the vehicle's throttle or on its brake. Normally, for speed control it is only necessary to control the throttle either to accelerate the car or to decelerate it by its own inertia. However, if the closing speed to another car becomes large it may be necessary to actuate the brake actuator 22 to prevent accidents. The speed control 20 may also be controlled by commands as shown such, for example, as a command to set the desired speed or an over-ride command to deactivate the system, or a command to resume the previously set speed.

It is also feasible to provide a speedometer logic circuit 23 into which are fed the speed pulses from the speed sensor 15 indicative of vehicle speed and a suitable timing signal from timing generator 16. The speedometer logic may now translate the number of pulses of the speed pulse train in a predetermined period of time into a decimal number which may then be displayed by the digital speed display 24.

Similarly, the pulse train from the speed sensor 15 may be impressed on an odometer logic circuit 25 which translates the total number of pulses into total miles and this number may be displayed by the digital odometer display 26.

The displays 24 and 26 may, for example, consist of light emitting diodes or the like electronic displays well know in the art. Displays of this type are presently used with electronic pocket calculators and electronic watches.

Figure 2A:
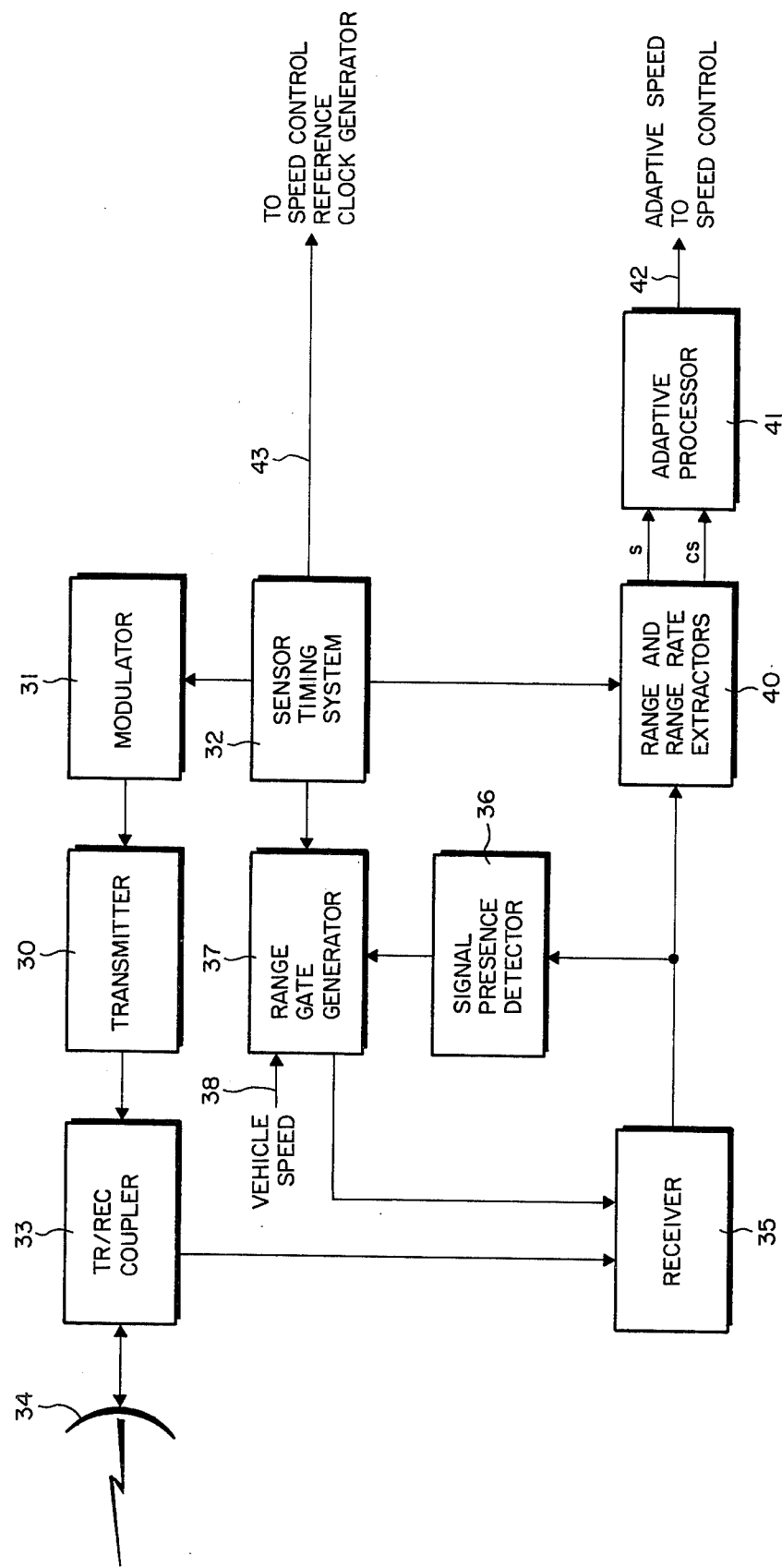
FIG. 2a and 2b are blocked diagrams of a preferred embodiment of the adaptive speed control of the present invention.
Figure 2B:
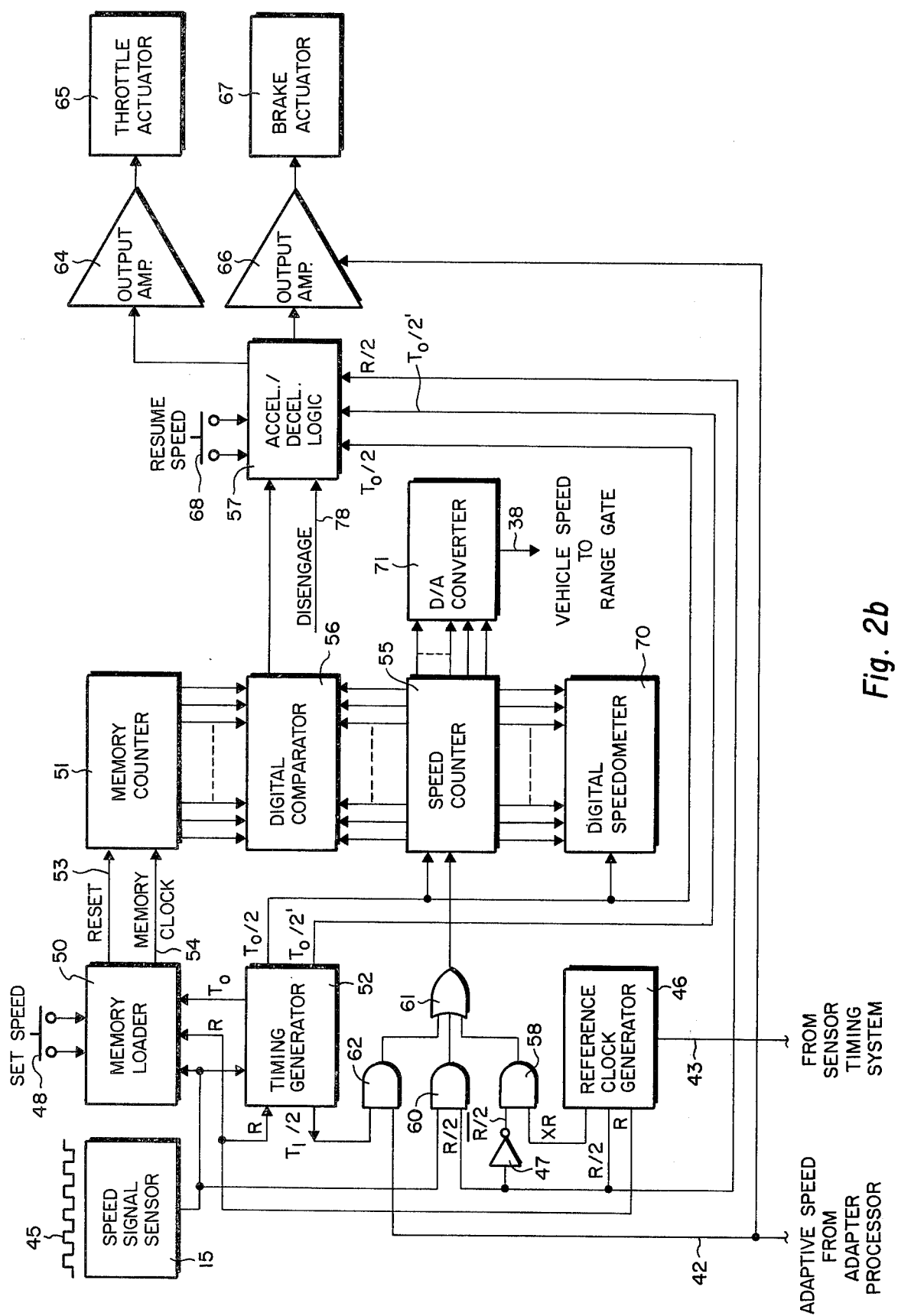

The relatively functional and schematic diagram of FIG. 1 will be more fully explained now in connection with FIGS. 2a and 2b which are more detailed.

However, it should be emphasized that the speed control subsystem which is used in the adaptive speed control system of the invention is generally known in the art. Thus various forms of digital speed control systems are presently known and the one to be explained presently in connection with FIG. 2b is only a representative example. Similarly, the speedometer and odometer logic 23 and 25 with their displays 24 and 26 are also well known in the art and therefore it is not believed to be necessary to give a further detailed explanation thereof.

Accordingly, reference is now made to FIGS. 2a and 2b which show in greater detail the adaptive speed control system of the invention. In this connection reference is also made to FIG. 3 and curves A – M thereof which illustrate various waveforms occurring in the system of FIGS. 2a and 2b as a function of time. FIG. 2a generally discloses the distance and closing speed sensor and the associated signal processing means for generating a relative speed signal which is then fed into the speed control system illustrated in FIG. 2b.

The relative speed sensor again includes a radar transmitter 30 which is fed by a modulator 31 controlled by a sensor timing system 32. This timing system may be considered as the master clock of the entire system because it has the highest frequency necessary for controlling the radar transmitter. In other words the sensor timing system 32 controls the duration of each radar pulse that is transmitted and the period between successive pulses. By way of example the transmitter 30 may generate a burst of a signal of approximately 18 gigahertz having a duration of say 50 nanoseconds. This radar pulse is now fed into a transmitter-receiver coupler 33 and radiated by the antenna 34. The beam width may be on the order of 4°. This radar pulse travels ahead of the car until it encounters a reflecting target such as another car. It is then returned back to the antenna 34 and routed by the coupler 33 to the receiver 35 where the information is amplified if it occurs within the limits of the range gate. Targets beyond the range gate are ignored.

The output of the receiver 35 is impressed on a signal presence detector 36. The signal presence detector 36 in turn is coupled to the range gate generator 37. A connection is provided between the range gate generator 37 and the signal presence detector 36 so that upon the presence of a signal the range gate widens by a predetermined amount, say 10% due to the feedback of the signal. This will prevent jitter of the presence signal for a radar echo which may just be at the limit of the set range.

The vehicle speed signal obtained from lead 38 is an analog signal and is derived from the system shown in FIG. 2b in a manner which will be subsequently explained. The range gate is made wider as the vehicle speed increases. The range gate generator 37 now opens the receiver 35 at a predetermined time after the radar pulse is sent out to feed information into a range and range gate extractor 40. As previously explained in connection with FIG. 1 this extractor 40 will generate the signal corresponding to the distance between the controlled vehicle and another vehicle ahead of it as well as the closing speed signal, the two signals being indicated by S and CS. As explained before, this signal processing is conventional in the radar art and may simply require a comparison of successive distance signals to obtain the relative speed or range rate (closing speed). These signals are now fed to an adaptive processor 41 which generates in digital form an adaptive speed signal which is representative of the speed change necessary to adapt the speed of the controlled vehicle to that of the other vehicle and to cause it to follow at a safe distance. The adaptive speed signal is now passed to the speed control of FIG. 2b by means of lead 42. Similarly, timing information from the sensor timing system 32 is fed by lead 43 into the speed control system shown in FIG. 2b.

The speed control system of FIG. 2b again includes a speed signal sensor 15 of developing a pulse train 45 having a number of pulses per unit of time representative of the speed of the vehicle. This speed signal 45 may be derived in a number of ways, for example by a rotating gear operatively connected to the vehicle drive train and which rotates at a speed proportional to the vehicle speed. The rotating gear may induce impulses into a detector as each gear tooth passes by the detector. Thus it will be seen that if the number of pulses from the pulse train 45 are counted over a predetermined period of time a number is derived which may be a binary number directly representative of the vehicle speed.

The sensor timing system 32 is connected by the lead 43 to a reference clock generator 46 which may be considered the basic clock for the speed control system. It generates three pulse trains identified as XR, R and R/2. The pulse train XR may have a repetition rate which is low compared to the repetition rate of pulse train 45 at normal driving speeds. By means of binary dividers in the reference clock generator the pulse train R may be generated from the pulse train XR. The frequency of pulse train R may be much lower than the repetition rate of pulse train 45 although it is feasible to provide a pulse train R having a much higher frequency than that of the speed signal. Pulse train 45 is shown by waveform A of FIG. 3 while waveform B shows the reference clock R and waveform C the pulse train R/2.

Figure 3:
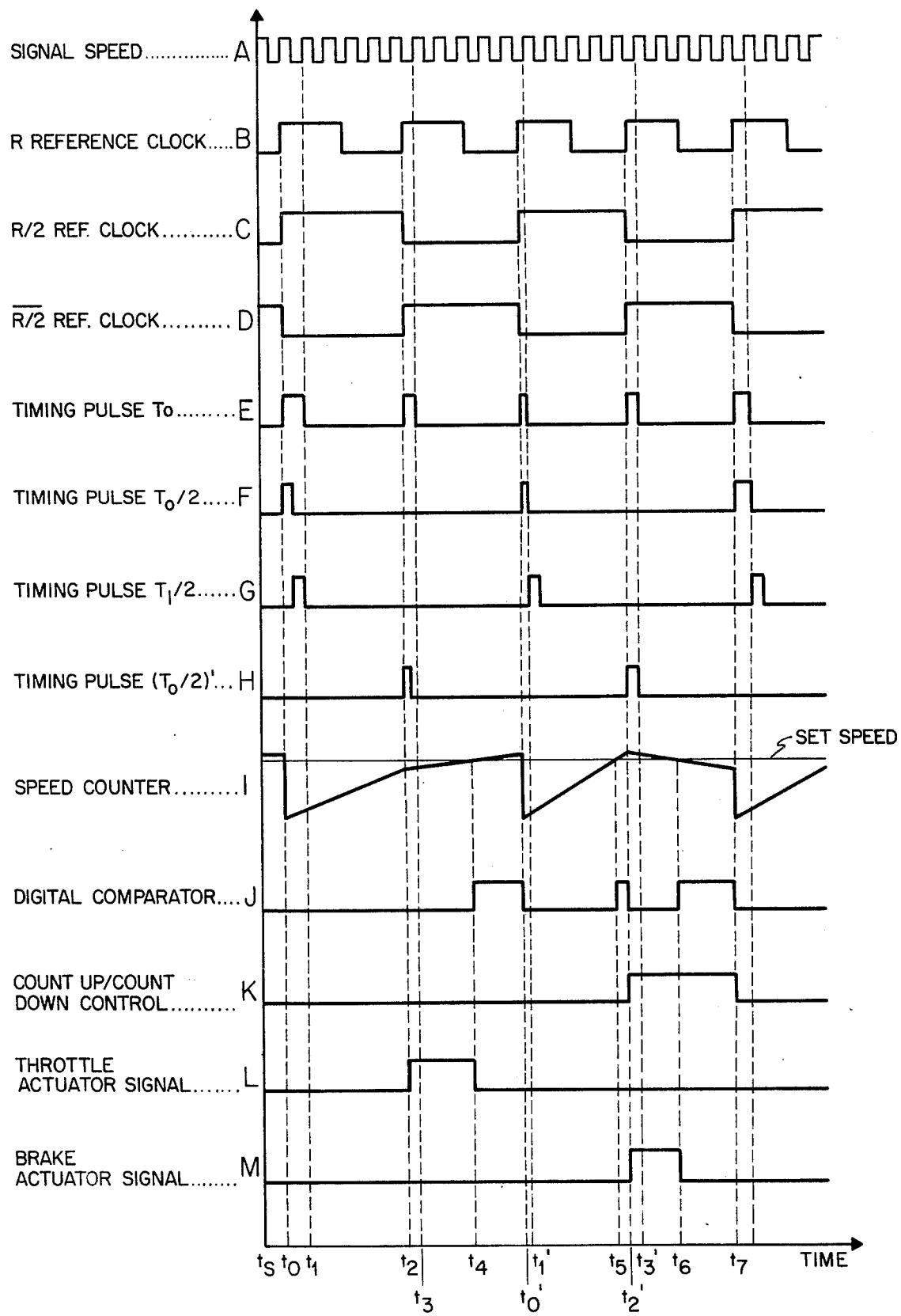
FIG. 3 is a timing diagram of the system of FIGS. 2a and 2b illustrating various waveforms occurring in the system as a function of time.

By means of an inverter 47 connected to the reference clock generator 46 the complement of pulse train R/2 may be formed, that is the pulse train $\overline{R/2}$ and this is shown in waveform D in FIG. 3.

In order to set the desired speed a set speed switch 48 may be depressed by the operator to enable a memory loader 50. This will enable the memory loader 50 to receive the pulse train 45 during a time period determined by pulse train R which is impressed thereon from the reference clock generator 46. Accordingly the memory loader 50 feeds the speed signal 45 by a lead 54 into a memory counter 51 over the predetermined period of time. Thereby a pulse train corresponding to a digital number is stored by the memory counter 51 and this stored number now becomes the desired set speed. A timing generator 52 receives the pulse train R from the reference clock generator 46 and produces output pulses $T_o$, $T_o/2$ and $(T_o/2)'$. These timing pulses are shown respectively in waveforms E, F and H of FIG. 3. Additionally the timing generator 52 develops another pulse train $T_1/2$ which is shown by waveform G in FIG. 3.

As shown in FIG. 3 each timing pulse $T_o$ rises to a predetermined potential on the leading edge of initiation of the first R pulse occurring at a time $t_o$. At the initiation of the next speed pulse 45 occurring at time $t_1$ the timing pulse $T_o$ returns to 0. Upon the occurrence of the next leading edge of pulse R occuring at a time $t_2$ the next timing pulse $T_o$ rises to its predetermined potential and falls to 0 at time $t_3$, that is upon the occurrence of the next speed signal pulse 45. Similarly, timing pulse $T_o$ rises at time $t_o'$ and falls at time $t_1'$; it again rises at time $t_2'$ and falls at time $t_3'$.

The timing generator 52 utilizes the pulse train $T_o$ to generate timing pulse $T_o/2$ and $T_o/2'$ as well as $T_1/2$. Thus as shown by waveform F timing pulses $T_o/2$ is derived from every even numbered $T_o$ pulse. As a result each $T_o/2$ timing pulse coincides with the leading edge or beginning of each R/2 pulse. Timing pulse $(T_o/2)'$ is derived similarly from every odd numbered $T_o$ pulse. As a result each $(T_o/2)'$ pulse coincides with the leading edge or beginning of each $\overline{R/2}$ pulse. It is, of course, possible to derive the $T_o/2$ and $(T_o/2)'$ pulses from the R/2 and $\overline{R/2}$ pulses respectively. The $T_1/2$ pulses shown in waveform G in FIG. 3 begin upon the occurrence of the trailing edge or the falling of each $T_o/2$ pulse.

Having now explained the various timing signals in connection with FIG. 3 the loading of the memory counter 51 can now be described. The memory loader 50 receives the train of speed signal pulses 45, as well as the R and $T_o$ timing pulses. In order to lead the memory counter 51 it is first necessary to activate the set speed switch 48. This enables the memory loader 50 at the beginning of the next R pulse. Thus assume that the speed switch 48 is activated at time $t_s$. The next R pulse shown on waveform B begins at time $t_o$. At this time a timing pulse $T_o$ resets the memory counter 51 by the reset line 53. The speed pulse train 45 is now directed through memory loader 50 and by means of the memory clock line 54 to the memory counter 51 thereby to load it.

Memory counter 51 is a digital register or counter clocked by the speed pulses 45 for one period of an R clock pulse. Accordingly, at the time $t_2$ the memory counter 51 stops counting and the memory loader 51 will not transmit any more speed pulses until the set speed button 48 is depressed again. This in turn will set a new speed. The digital number stored in memory counter 51 is proportional to the set speed of the vehicle because the counter has stored a number corresponding to the number of speed pulses 45 occurring during an R clock period.

A speed counter 55 is also a digital counter or register and is clocked by either the speed signal 45 in a manner which will be subsequently explained or by the XR pulses from the reference clock generator 46 and is reset to 0 by a $T_o/2$ timing pulse received from the timing generator 52.

A digital comparator 56 is coupled to both memory counter 51 and speed counter 55 and receives inputs in parallel from both counters. It preferably is an up or down counter. When the output of memory counter 51 equals that of speed counter 55, the digital comparator 56 generates an output pulse impressed on the acceleration/deceleration logic 57. The operation of the acceleration/deceleration logic 57 will be subsequently explained in connection with FIG. 6.

The manner in which speed counter 55 is clocked will now be explained. The XR pulse train and the $\overline{R/2}$ pulse train obtained from inverter 47 are fed to a first AND gate 58. Speed signal 45 and pulse train R/2 are fed to a second AND gate 60. The outputs of the two AND gates 58 and 60 are fed to an OR gate 61. Finally, the output of the OR gate 61 is used to clock the speed counter 55. For the time being, the additional AND gate 62 and its function will be disregarded. It actually serves the purpose to correct the digital number stored in speed counter 55 in accordance with the adaptive speed of the vehicles obtained from lead 42 from adaptive processor 41.

As shown in FIG. 3, from the time $t_o$ until the time $t_2$ $\overline{R/2}$ will be high and therefore R/2 will be low. As a result AND gate 60 will be enabled (from time $t_o$ to time $t_2$) while AND gate 58 will be disabled. Accordingly, the speed signal pulses 45 are able to clock speed counter 55 via AND gate 60 and OR gate 61.

From time $t_2$ until time $t_o'$ R/2 will be low and hence $\overline{R/2}$ will be high. Obviously, therefore, during this period AND gate 60 will be disabled while AND gate 58 will be enabled. Therefore, the XR pulses from reference clock generator 46 will clock speed counter 55 by means of AND gate 58 and OR gate 61.

The output of speed counter 55 is shown in FIG. 3 at I. The horizontal line labeled "set speed" represents a count corresponding to that of memory counter 51. If its height were higher the set vehicle speed would be higher and vice versa. At the times $t_o$, $t'_o$, etc. timing pulse $T_o/2$ resets speed counter 55 and digital comparator 56 is also reset to 0 by the speed counter. From time $t_o$ until time $t_2$ speed counter 55 is clocked by the speed signal 45. From time $t_2$ until time $t_o'$ the speed counter 55 is clocked by the XR output of reference clock 46. At a time $t_4$ the output of speed counter 55 equals that of memory counter 51 causing digital comparator 56 to generate an output pulse as shown in FIG. 3 by waveform J. The output of digital comparator 56 remains high and speed counter 55 continues to count until the end of the period $t_o'$ at which time both are reset to 0 in response to a $t_o/2$ timing pulse.

Acceleration/deceleration logic 57 controls the speed of the vehicle as a result of the digital speed control and the waveform J in the following manner. The logic 57 receives timing pulses $T_o/2$ $(T_o/2)'$ and R/2 from the timing generator 52 and the reference clock generator 46 respectively. The output of logic 57 is amplified either by a throttle output amplifier 64 which controls the throttle actuator 65, or by a brake output amplifier 66 which operates the brake actuator 67. The throttle actuator 65 directly controls the throttle of the vehicle while the brake actuator 67 operates the brakes of the car. The logic 57 is also provided with a disengage input lead 78 serving to disable the logic 57. This is for the purpose of allowing the operator to resume control and operation of the car. On the other hand, operation of button 68 will again enable the logic 57.

A digital speedometer 70 may be connected to the speed counter 55 to provide a digital speed display as explained briefly in connection with FIG. 1. Furthermore, a digital-to-analog converter 71 is coupled to the speed counter 55 to receive in parallel the digital number stored in the speed counter 55. This digital number, of course, represents the actual speed of the vehicle and is converted by the digital-to-analog converter 71 into an analog signal representative of the vehicle speed. This signal is obtainable from output lead 38 which in turn is fed to the range gate generator 37 as previously explained.

Figure 6:
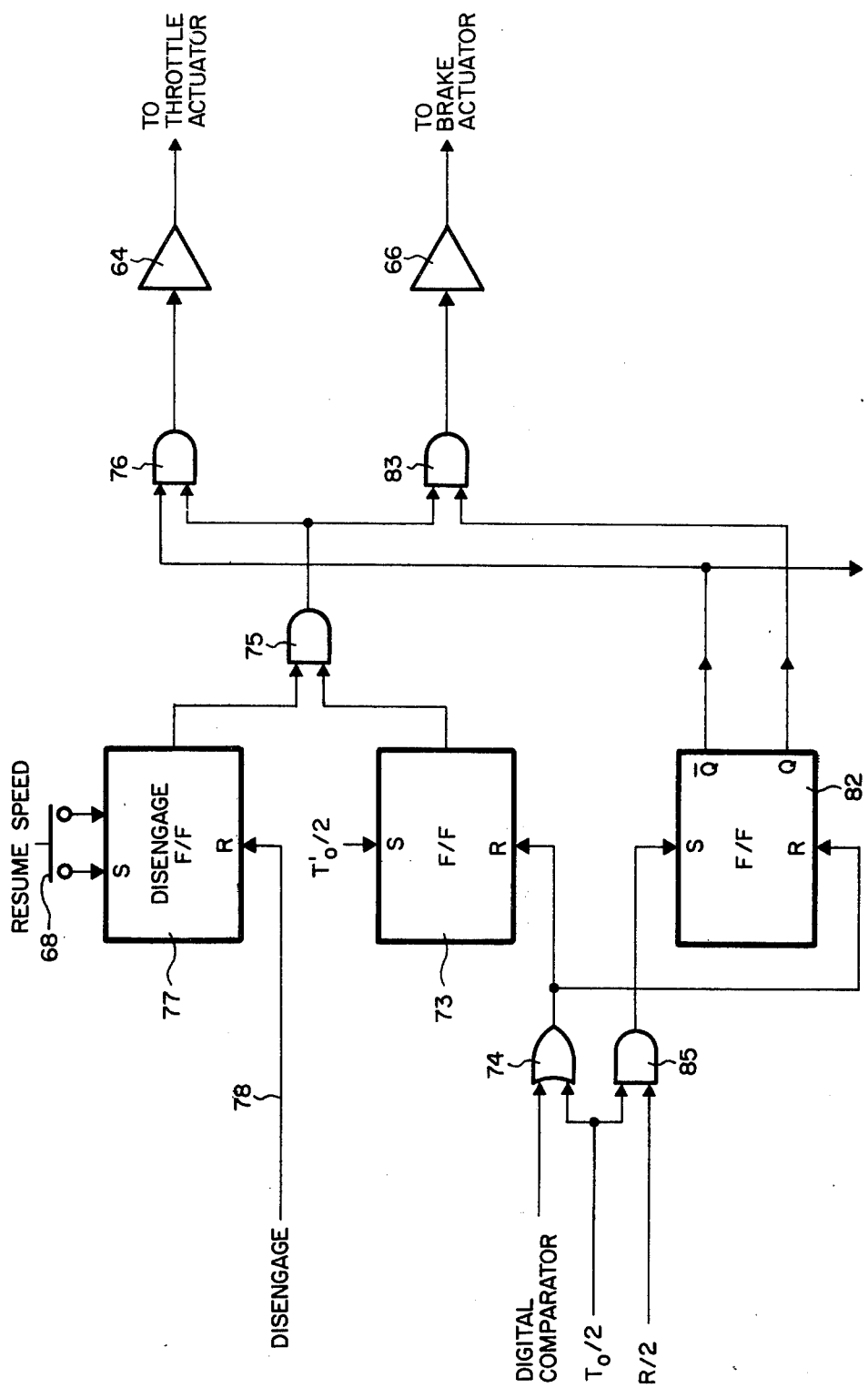
FIG. 6 is a logic diagram of the accelerator-decelerator logic embodied in the control system of FIG. 2b.

The acceleration/deceleration logic 57 will now be explained in more detail in connection with FIG. 6. However in order not to confuse the explanation only that portion of the diagram of FIG. 6 will be explained which has to do with the speed control. How the speed control is modified in accordance with the relative vehicle speed or the closing speed will be subsequently explained.

An output flip-flop 73 is set by its S (set) input by the receipt of a $(T_o/2)'$ pulse and is reset on its R (reset) input by the output of an OR gate 74 upon receipt of a pulse from digital comparator 56 or $T_o/2$ pulse from timing generator 52. The output of flip-flop 73 is fed to the throttle output amplifier 64 and thence to the throttle actuator 65 by two AND gates 75 and 76 connected in cascade.

As indicated before, the system may be disengaged by the application of a suitable disengage pulse on lead 78. This disengage pulse may be generated in any suitable manner, for example, by a pushbutton or by moving the transmission into neutral. The disengage pulse is applied to the reset (R) input of a disengage flip-flop 77 which in turn disables the AND gate 75 thus preventing any signals from passing through the subsequent AND gate 76 to the output amplifier 64. The disengage flip-flop 77 may be reset by operating the resume speed switch 68 which provides a signal to the set (S) input and hence enables AND gate 75, thus returning the system to the previously set speed. The generation of the throttle actuator signal will now be explained by reference to FIGS. 3 and 6. A $(T_o/2)'$ pulse at a time $t_2$ sets flip-flop 73. When the counter 55 has counted up to the set speed the output of digital comparator 56 (waveform J) resets flip-flop 73 by means of OR gate 74 at a time $t_4$. Digital comparator 56 is reset in response to a $T_o/2$ pulse which occurs at the time $t_o'$. If the actual speed of the vehicle is less than the set speed the comparator will generate an output pulse after time $t_2$. The length of time from $t_2$ to $t_4$ is proportional to the difference in speed between the set and the actual speed of the vehicle. A square wave is generated having a pulse width proportional to the difference in speed. To this end flip-flop 73 is set by a $(T_o/2)'$ pulse at time $t_2$ and reset by the digital comparator pulse at the time $t_4$. This will generate the throttle actuator signal shown by waveform L in FIG. 3.

If the actual vehicle speed is much lower than the set speed, speed counter 55 may never count up to the set speed prior to the beginning of the next R/2 clock period. To ensure that output flip-flop 73 will reset in time for the next $(T_o/2)'$ pulse, a $T_o/2$ timing pulse resets flip-flop 73 by means of OR gate 74 at times $t_o$, $t_o'$, etc. Therefore, the maximum duty cycle of the acceleration/deceleration logic 57 is 50%.

If the actual vehicle speed is greater than the set speed, speed counter 55 will count up to the set speed from a time $t_o'$ to a time $t_5$ which occurs prior to time $t_2'$. The output of digital comparator 56 will occur at the time $t_5$ (see waveform J) and will inhibit output flip-flop 73 from being set at time $t_2'$ by timing pulse $(T_o/2)'$. In this case no throttle will be applied and the vehicle will slow down to the set speed.

It will therefore be evident that the acceleration/deceleration logic 57 produces a pulse-width modulated square wave (waveform L) which has a pulse-width proportional to the difference in speed between the set speed and the actual speed as long as the actual vehicle speed is less than the set speed. If the actual speed is greater than the set speed no throttle will be applied until the vehicle speed falls below the set speed.

Figure 4:
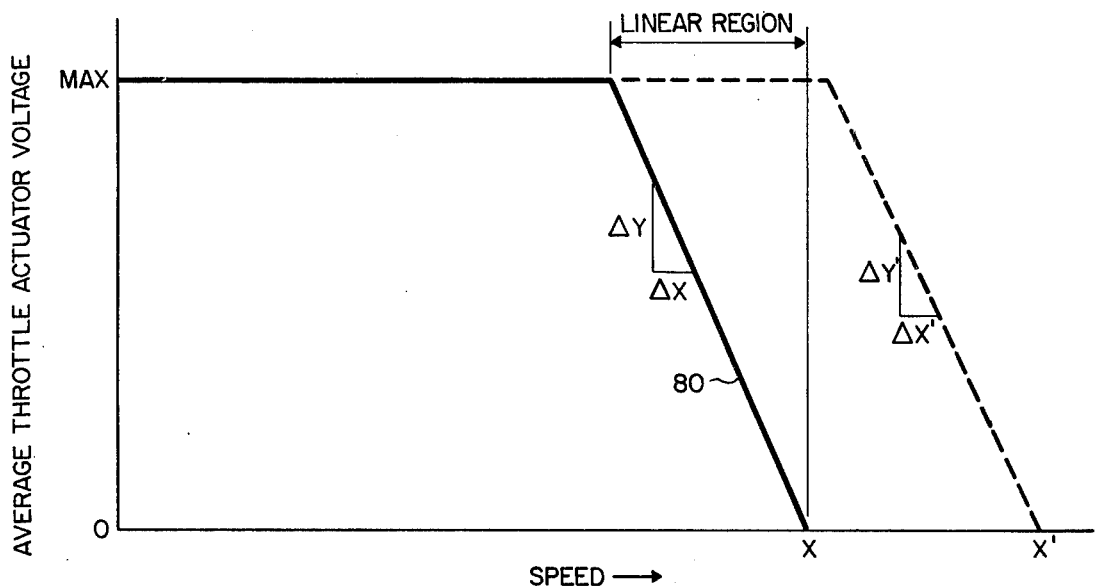
FIG. 4 is a plot of the average throttle actuator voltage as a function of speed.

This is illustrated in FIG. 4 to which reference is now made. Thus as explained before, if the vehicle speed is equal to or greater than the set speed X the output of digital comparator 56 will inhibit the throttle actuator signal which is accordingly 0. This, of course, will cause the vehicle to slow gradually until it reaches the set speed X.

At speeds below the set speed X the average throttle actuator voltage increases linearly as shown by curve 80 until it reaches the maximum value. The latter occurs when the actual vehicle speed is so far below the set speed that speed counter 55 will not even count up to the set speed during one period of the R/2 pulse. When this occurs the throttle actuator voltage as shown in curve portion L of FIG. 3 rises at time $t_2$ and remains high until a $T_o/2$ pulse resets output flip-flop 73. This occurs at a time $t_o'$. It will now be evident that a 50% duty cycle is obtained to cause throttle actuator 65 to apply maximum throttle to increase the actual vehicle speed to the set speed.

It will be evident that the maximum value of the average throttle actuator voltage is proportional to the maximum output of throttle amplifier 64. By adjusting the gain of amplifier 64 the maximum average throttle actuator voltage can be raised or lowered.

The gain of the speed control error voltage is the slope $\Delta Y/\Delta X$ of curve 80 as shown in FIG. 4. This slope can be adjusted by altering the pulse repetition rate of pulses XR from reference clock generator 46. If the pulse repetition rate is decreased speed counter 55 will take longer to count up to the set speed for a given difference between set and actual vehicle speeds. Since the speed counter 55 now takes longer to count up to the set speed the pulse width of the output signal, that is the throttle actuator signal, is increased and the average throttle actuator voltage is also increased. Therefore, the slope of curve 80 becomes steeper and the gain of the speed control error voltage is also increased. It will be evident that the opposite happens if the pulse repetition rate of pulses XR is increased. This will cause a reduction of the slope of curve 80 and a decrease of the gain of the speed control error voltage.

If the set speed is higher such as X' the gain of the system equals $\Delta Y'/\Delta X'$ which is equal to $\Delta Y/\Delta X$. This is so because the average throttle actuator voltage is proportional to the absolute difference in speed between the set speed and the actual vehicle speed and is not a percentage difference in speed.

How the speed control of the car is modified by the measurement of the distance and closing speed to another car will now be explained.

Referring again to FIG. 2a it will be recalled that the adaptive speed, that is the equivalent closing speed to another vehicle, is obtained from the adaptive processor 41 by a lead 42. As shown in FIG. 2b this adaptive speed is impressed by lead 42 onto AND circuit 62. The AND circuit 62 is enabled by the timing signal $T_1/2$. This signal shown by G in FIG. 3 rises in response to the trailing edge of the timing pulse $T_o/2$ that is after the time period $t_o$. Accordingly, at this period the AND circuit 62 is enabled to pass the adaptive speed signal from a lead 42 through AND circuit 62, and OR circuit 61 to speed counter 55.

The result is that additional high frequency pulses derived from the radar system shown in FIG. 2a are fed into the speed counter 55. By injecting these extra pulses into the speed counter 55 the reference or set speed obtained from memory counter 51 is effectively decreased. Alternatively, it may be considered that the actual vehicle speed which is clocked into the speed counter 55 is effectively increased.

Assuming, for example, that each count of the speed counter 50 is equal to ½ mile per hour (mph), and assuming that the number stored in memory counter 51 is decimal 126 corresponding to 63.0 mph, the car will be traveling at approximately 60 mph or just far enough below the set speed to provide cruising throttle opening. When a speed correction due to traffic is made by means of the adaptive speed signal, a pulse train is injected into the speed counter 55. Supposing 20 pulses are generated by the radar which now clocks the speed counter from decimal 0 to decimal 20 corresponding to 10 mph. Thus the speed counter reaches coincidence with the number decimal 126 at a count of decimal 106 corresponding to 53 mph which in effect becomes the new reference or set speed. As a result the vehicle throttle closes and the car slows down to approximately 53 mph. How a braking signal is generated will now be described by reference to FIGS. 5 and 6.

The digital comparator signal shown in waveform J of FIG. 3 is routed by a flip-flop 82 either to the AND gate 76 which controls throttle amplifier 64 or to AND gate 83 which controls brake amplifier 66. It will be recalled that the digital comparator signal is passed by OR gate 74 upon the occurrence of a pulse $T_o/2$ which in turn resets the flip-flop 73 which has previously been set by the occurrence of a timing pulse $(T_o/2)'$. Hence when the flip flop 73 is set it will enable the AND gate 75 to pass either a throttle signal as shown by curve L of FIG. 3 or a brake signal as shown by curve M of FIG. 3 to the respective output amplifier 64 or 66. Whether the pulse width modulated signal is impressed on the throttle amplifier 64 or on the brake amplifier 66 is determined respectively by the $\overline{Q}$ output or by the Q output of the flip-flop 82.

The flip-flop 82 is set by an AND gate 85 upon which are impressed the $T_o/2$ and R/2 pulses. Hence when R/2 is high and $T_o/2$ is also high, that is at time $t_o$ or $t_o'$, the AND gate 85 passes a signal to set the flip-flop 82. On the other hand, the flip-flop 82 is reset by the OR gate 74, that is in response to the occurrence of either a digital comparator signal waveform J or a $T_o/2$ pulse. Hence at the time $t_o'$ the R/2 clock signal is high and a timing pulse $T_o/2$ occurs. This will now set the flip-flop 82 so that the Q signal is high and the $\bar{Q}$ signal is low. The flip-flop 82 is reset upon the occurrence of either the following pulse $T_o/2$ which occurs at the time $t_o$ or the occurrence of a digital comparator signal at a time $t_4$. Thus, the throttle actuator signal shown in waveform L occurs between the times $t_2$ and $t_4$, that is from the time of the occurrence of a timing pulse $(T_o/2)'$ (applied to flip-flop 73) until the occurrence of the digital comparator signal.

If on the other hand the digital comparator signal occurs say at a time $t_5$, that is before the occurrence of a timing pulse $(T_o/2)'$ a brake actuator signal as shown by waveform M will be applied to the brake actuator 66. This is so because the flip-flop 82 is still set by the occurrence of the $T_o/2$ signal at a time $t_o'$ at which time the R/2 reference clock is high. The flip-flop 82 is only reset at a later period of time, that is when the timing pulse $T_o/2$ occurs, that is at a time $t_7$.

It will now be seen that the flip-flop 82 routs the digital comparator signal dependent upon whether the comparator signal occurs before or after the $T_o/2$ pulse. The speed counter 55 is arranged as an up or down counter in accordance with the up or down control illustrated in waveform K of FIG. 3. Thus whenever the speed count exceeds the set speed count, or memory count, such as the time $t_5$ and before the occurrence of a timing pulse $(T_o/2)'$ at a time $t_2'$, the up or down count of the speed counter reverses as clearly shown by the curve portion K. It will also be noted that the flip-flop 73 is set upon the occurrence of a $(T_o/2)'$ signal, that is at the beginning of each time period $t_2$, $t_2'$, etc. It is then reset when both the signal $T_o/2$ and the digital comparator signal are present.

Figure 5:
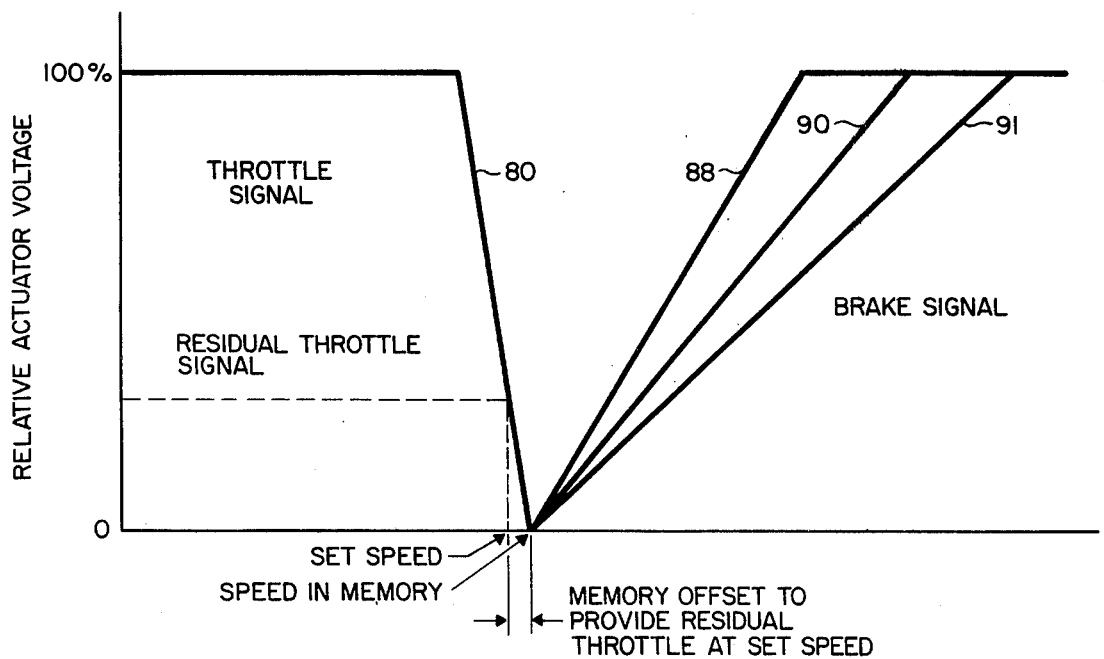
FIG. 5 is a similar plot of the average brake actuator voltage as a function of speed showing a family of brake actuator voltages as a function of spacing to another vehicle and closing speed.

As shown in FIG. 5, the throttle signal 80 is again as previously explained a linear function. Preferably there is provided a residual throttle signal which is obtained by a memory offset, that is an offset of the memory counter 51. This serves the purpose to provide a residual throttle signal at the set speed so as to maintain the speed of the car at the set speed.

Upon application of the brake signal a relative actuator voltage such as curve 88 may be obtained. Actually, FIG. 5 shows a family of brake actuator curves 88, 90 and 91. These are provided to illustrate the increase of the amplitude of the brake signal as a function of the adaptive speed. By way of example, curve 88 may correspond to a spacing of 50 ft., curve 90 may correspond to 100 ft. and curve 91 to a spacing of 200 ft. This may be accomplished by controlling the gain of the brake output amplifier 66. This control is obtained by connecting lead 42 to the output amplifier 66 which applies the adaptive speed signal from the adaptive processor to control the gain of the amplifier. Hence the brake output amplifier 66 should be a variable gain amplifier. It will, of course, be realized that this refinement may not always prove to be necessary or desirable.

It will be noted that the gain of the brake output amplifier 66 is controlled by the lead 42 which applies thereto the adaptive speed signal. The adaptive speed signal, however, is a digital signal and will usually consist of a pulse train. It is therefore desirable to integrate the pulse train in any conventional manner. Thus the output amplifier 66 may, for example, include an integrating network fed by a diode which is made conductive by each pulse of the pulse train. This will then develop a direct-current signal which is the integral of a pulse train and which controls the gain of the brake output amplifier. By controlling the amplifier 66 in this manner a substantially square law relationship may be obtained between the adaptive speed and the applied braking force.

With the adaptive speed control of the invention it is also feasible to slow down the set speed of the car when the car approaches or moves through a curve. How this is effected is shown in FIGS. 7 and 8 to which reference is now made. FIG. 7 illustrates a portion of a road generally indicated at 100. On the right-hand side of the road a vehicle 101 travels and generates a radar beam illustrated at 102. The road 100 is curved as shown and is provided with spaced guard posts 103 operating as radar beam reflectors and which are successively illuminated by the radar 102 as the car travels through the curve. The adaptive speed control system of the invention will interpret each post or reflector as a vehicle or obstacle having a certain distance and a large closing speed. This in turn will be interpreted as an order to apply the brakes and reduce the speed of the car.

As shown in FIG. 7, the reflectors 103 may be relatively widely spaced. Therefore, the vehicle will illuminate one reflector such as 104 at a time. After a certain period of time the reflector 104 will no longer be illuminated by the radar beam and hence the vehicle will tend to resume speed. By that time the radar will illuminate the following post. By properly spacing the reflectors any desired reduction in speed of the controlled vehicle may be obtained. The desired speed reduction may depend for example on the curvature of the curve. Alternatively, the reflectors may be used for reducing the speed of a vehicle leaving a freeway or highway on an off ramp.

As illustrated in FIG. 8, the reflector 103 may have a generally U-shaped cross-section to reflect a radar beam illustrated at 105. Thus as shown the reflector 103 operates as a corner reflector to return the radar beam 105 back upon itself. Another corner reflector 106 is shown in FIG. 9 which has the shape of a V and which will return a radar beam 107 back upon itself. It will be understood that other reflectors may be used instead of those shown in FIGS. 8 and 9 by way of example.

There has thus been disclosed a digital adaptive speed control system which will modify the set speed normally maintained by a digital speed control system. The effective desired speed is decreased or the effective vehicle speed is increased by an amount corresponding to the closing speed and distance between the controlled car and the car ahead thereof. The sensor which generates the distance and closing speed signals preferably is a radar having a range gate which varies with the actual vehicle speed. The range of the range gate may be extended upon receipt of a return echo to prevent jitter which might otherwise occur when the return echo is just at the edge of the range gate. The speed of the car is controlled not only by the application of a throttle signal to the throttle actuator but also by the application of the brake signal to the brake actuator. Both the amplitude and duration of the brake signal may be controlled in accordance with the adaptive speed signal derived from the closing speed and the distance. The resulting increase in brake force as the closing speed increases, or the distance decreases, serves to minimize the safe following distance for the controlled vehicle.

What is claimed is:

1. A digital adaptive speed control for a motor vehicle comprising:
   a. means for generating a first train of pulses representative of the speed of the vehicle;
   b. a digital memory register coupled to said pulse generating means for storing a first digital signal representative of the desired speed of the vehicle;
   c. a digital comparator coupled to said pulse generating means and to said memory register for comparing the first digital signal with a second digital signal representative of said pulse train during a predetermined period of time, and for generating an error signal;
   d. a throttle actuator coupled to said comparator means;
   e. a brake actuator coupled to said comparator means;
   f. a radar for sensing the distance and closing speed to another vehicle ahead of the control vehicle and for developing a second pulse train representative of an adaptive speed signal;
   g. a range and range rate extractor coupled to said radar for generating distance and closing speed signals;
   h. a pulse gate generator coupled to said radar for generating a range gate, said digital comparator being coupled to said pulse gate generator for generating a range gate having a time duration dependent upon the vehicle speed;
   i. means for coupling said radar to said digital comparator for modifying said error signal in accordance with said adaptive speed signal; and
   j. means for selectively actuating said brake actuator to reduce the speed of the control vehicle in response to said adaptive speed signal.

2. An adaptive speed control as defined in claim 1 wherein a digital-to-analog converter is coupled between said comparator and said pulse generator for generating an analog signal representative of the vehicle speed and impressing it upon said pulse gate generator.

3. An adaptive speed control as defined in claim 1 wherein said radar includes a signal presence generator, and a feedback connection between said signal presence generator and said pulse gate generator for extending said range gate by a predetermined amount upon the presence of a signal from said detectors.

4. An adaptive speed control as defined in claim 1 wherein a throttle amplifier is coupled between said comparator and said throttle actuator, a brake amplifier coupled between said comparator and said brake actuator, and means for impressing said adaptive speed signal on said brake amplifier for controlling its gain, thereby to operate said brake actuator in accordance with the square of said adaptive speed signal.

* * * * *